INVENTOR:
WALTER ALEXANDER LEA
BY W A Beatty
ATTORNEY.

June 19, 1951 W. A. LEA 2,557,297
PHOTOGRAPHIC CAMERA BODY
Filed Sept. 13, 1946 3 Sheets-Sheet 2
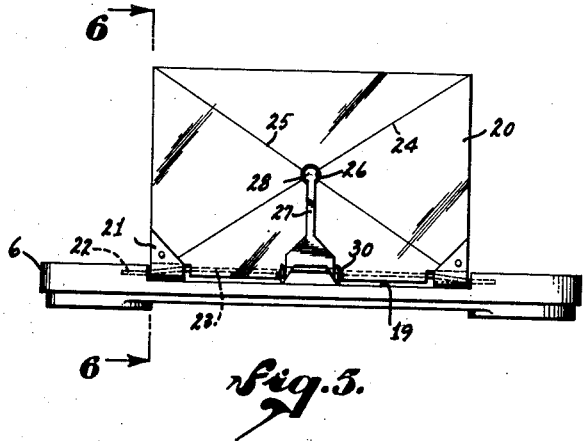
Fig. 5.
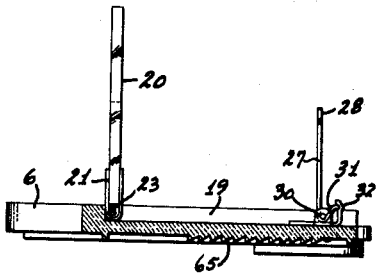
Fig. 6.
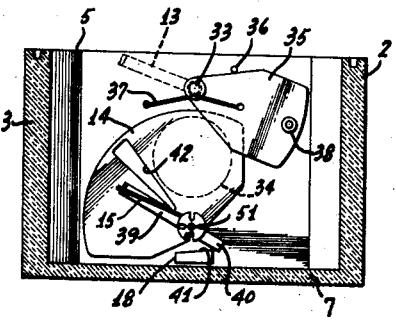
Fig. 7.
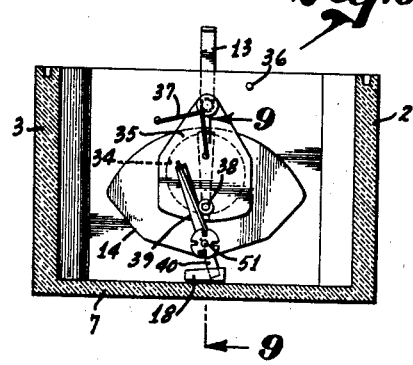
Fig. 8.
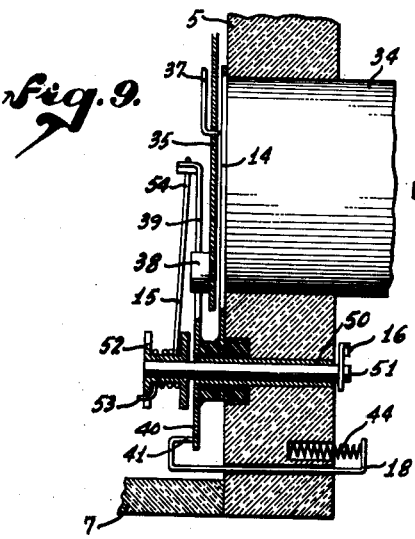
Fig. 9.
Fig. 10.
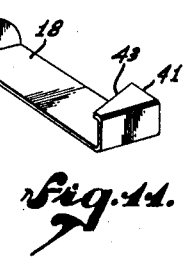
Fig. 11.
INVENTOR:
WALTER ALEXANDER LEA
BY W. A. Bratt
ATTORNEY.

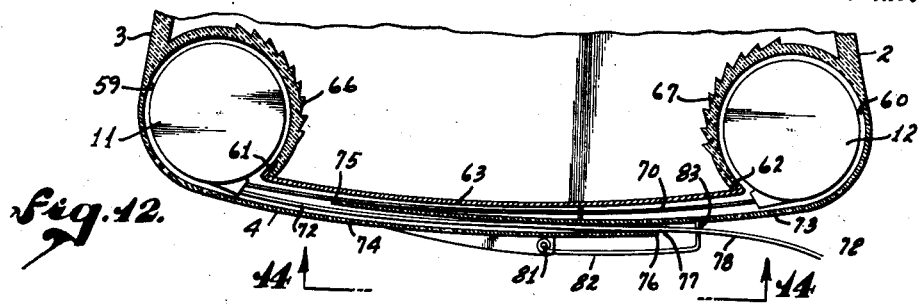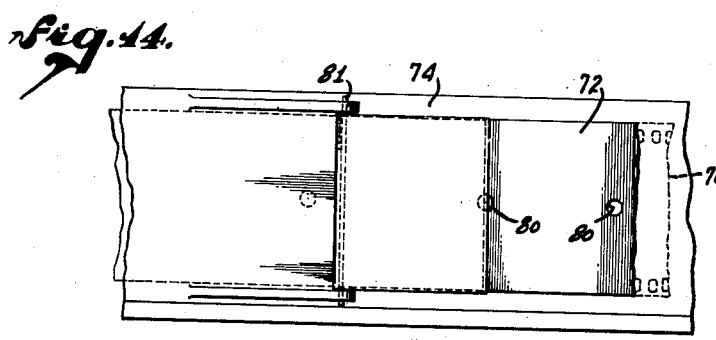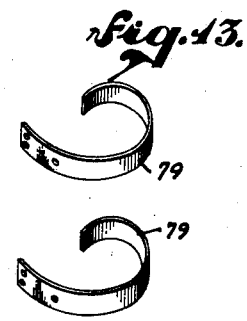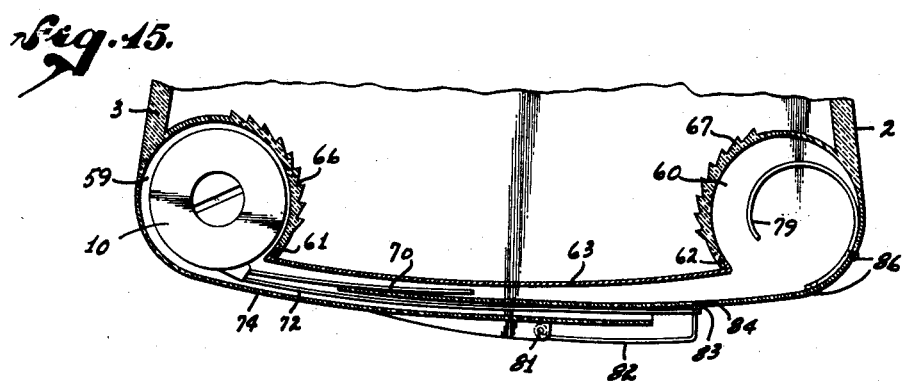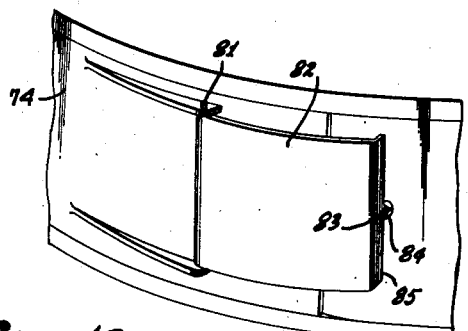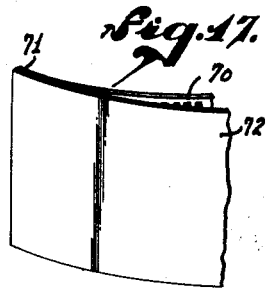

Patented June 19, 1951

2,557,297

UNITED STATES PATENT OFFICE 2,557,297

PHOTOGRAPHIC CAMERA BODY

Walter Alexander Lea, Los Angeles, Calif., assignor to Earl V. Ehrhardt, Altadena, Calif.

Application September 13, 1946, Serial No. 696,706

2 Claims. (Cl. 95—31)

The invention relates to various improvements in a photographic camera, more particularly a camera of small size and in which a roll of film is to be used.

Some of the faults in cameras are: (1) The shutter release is either so relatively inaccessible or is so awkward to operate, or both, that the operator jars the camera and blurs the picture when operating the shutter release. Also most types of shutter releases are not equally accessible to the fingers of the right and left hands. (2) The view finder of the usual small camera produces an optical reduction of the scene, with the result that the scene as viewed in the view finder is very small and usually difficult to see or find, also no means are provided for finding the center of the photographic field. (3) The usual type of roll film camera frequently leads to scratches on the film which are reproduced as objectionable lines on the picture print. This is due to the fact that the film is coiled on itself and uncoiled several times, the back of one coil facing and scratching the emulsion side of the adjacent coil, particularly when there is slippage between the adjacent coils.

The object of the invention is to provide a camera overcoming the above defects and having a number of additional advantages.

The invention provides an improved shutter release which is equally accessible to the fingers of either hand, and in fact may be operated by one of several fingers of one hand which holds the camera, the release being operated by an inward or squeeze action which is less likely to jar the camera than heretofore.

Another feature of the invention relates to the view finder which is an improvement in that the scene can be viewed in its natural size while preferably also viewing the adjoining or contiguous portions of the scene, means being provided to indicate the center of the photographic field.

The invention also provides an improved arrangement for transporting or traversing the film through the camera, use being made of a paper strip coiled with the film so that the paper coils separate and protect the emulsion surface from the back of an adjacent coil. The end of the paper strip is made accessible at the exterior of the camera, and it may be pulled, preferably by hand, to propel the film. The strip has stops or marks so as to indicate or mark the picture lengths on the film, and the paper length corresponding to each picture length may serve as a medium on to which photographic data or notes may be written for each picture. As the paper is originally coiled with the film when it is wound on the supply spool, the paper protects the film at this time and also when the spool is unwound after the film is exposed in the camera, thereby reducing the likelihood of scratching the film.

For further details of the invention references may be made to the drawings wherein Fig. 1 is the perspective view of a camera according to the present invention. Fig. 2 is a vertical sectional view along the optical axis of the camera of Fig. 1.

Fig. 5 is a rear view in elevation of the view finder.

Fig. 6 is a sectional view of lines 6—6 of Fig. 5 looking in the direction of the arrows.

Fig. 7 is a sectional view on lines 7—7 of Fig. 3 looking in the direction of the arrows, showing the shutter in cocked position.

Fig. 8 is a view corresponding to Fig. 7 showing the operating parts in another position.

Fig. 9 is an enlarged sectional view with parts broken away on lines 9—9 of Fig. 8 looking in the direction of the arrows.

Figs. 10 and 11 are perspective views of details of the shutter release.

Fig. 12 is a horizontal sectional view showing the back of the camera, with parts removed. Figs. 12 to 16 are enlarged.

Fig. 13 is a perspective view of springs to guide the film in the coil.

Fig. 14 is a front elevation looking in the direction of the arrows on lines 14—14 of Fig. 12.

Fig. 15 is a sectional view corresponding to Fig. 12 of a modified receiver.

Fig. 16 is a perspective view, with parts broken away, of the back of the camera.

Fig. 17 is a perspective view of the inner end of the film and paper strip, with parts broken away.

Figure 1:
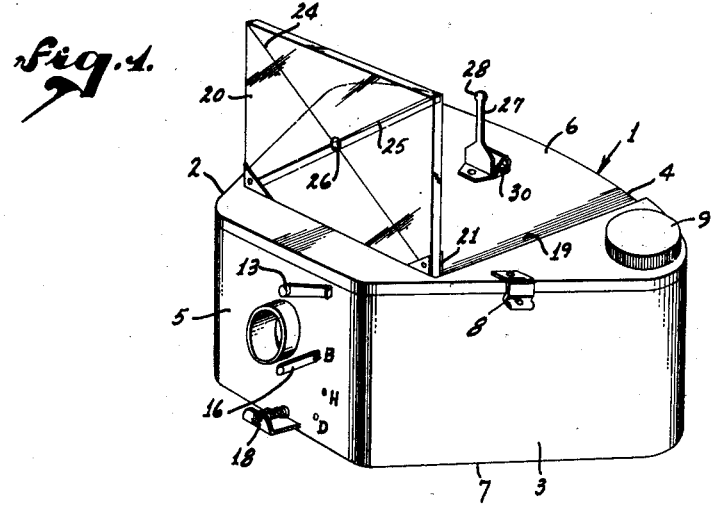

Referring in detail to the drawings, the camera of Fig. 1 is in the form of a box or casing 1 having tapered sides 2 and 3, a curved back 4 and a flat front 5, with parallel top 6 and bottom 7. The top 6 is removable and held in place by suitable clips 8.

The casing 1 may be made of plastic or other opaque material. Figs. 1 to 4 illustrate substantially the full size and shape preferred, although other sizes and shapes may be employed.

On the top 6 is a rewind knob 9 which may be employed to rewind the spool 10 shown in Fig. 15 if it is desired to use a rewind arrangement. If no rewind is desired, a non-rewind arrangement being shown in Fig. 12, the knob 9 can be omitted, no winding or rewinding knob being required for either the supply spool 11 or the receiver spool 12 in Fig. 12, due to the improved form of film transporting arrangement described hereafter.

At the front 5 is a blinder handle 13 which may be used to cock the shutter 14, see Figs. 2, 3 and 7 to 9, under tension of a spring 15. The speed of the shutter is adjusted by a handle 16 which adjusts the tension of spring 15. Handle 16 is of spring metal and as shown in Fig. 10 its outer end has a projection 17 adapted to fit in three recesses marked B, H and D in Fig. 1, these positions giving to the spring 15 a tension such that the speed of the shutter 14 is appropriate for photographing a scene under lighting conditions which are bright, hazy and dull respectively.

The shutter 14 is released by pressing in on the shutter release slide 18 located at the bottom front center of the camera where the shutter release 18 is in position to be operated by any finger of either hand, if the camera is held by both hands, or it may be operated by any one of several fingers of one hand if the camera is held if the camera is held in one hand. Due to the location of the shutter release 18 and due to the fact that it is operated by squeezing or pushing it inwardly toward the front of the camera, the camera is less likely to be jarred than heretofore.

Figure 2:
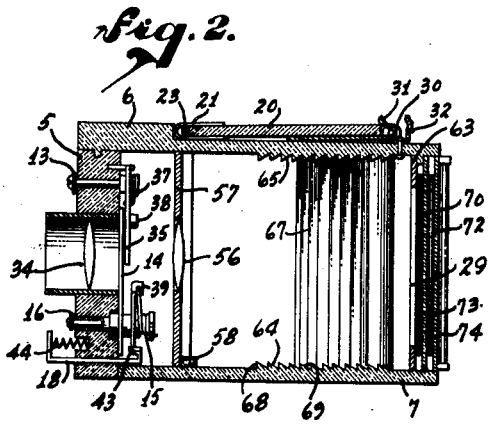

The top 6 has a rectangular recess 19 at the front edge of which is connected a view finder 20 by a hinge 21. As shown in Figs. 5 and 6, the hinge 21 has a wire 22 which is secured at its opposite ends in the top 6, the wire passing through the hinge 21. Also the wire passes through the hinge 21 at a greater height as indicated at 23 than it is secured to the top 6, this offset serving as a tension device to hold the view finder upright. This offset does not exist when the view finder 20 is folded into the recess 19 as shown in Fig. 2.

The view finder 20 is a rectangular plate of transparent pink plastic, the color pink being preferred as it forms a contrast with the average scene. The view finder 20 has crossing lines 24, 25 which define the center 26. Behind the finder 20 is a rear sight 27, its upper end being rounded as indicated in 28 to mask the hole 26 when the eye of the operator is close to the camera and in position to look directly forward in line with the optical axis of the camera. A line through the elements 28, 26 is parallel to the optical axis and while this results in a small amount of vertical parallax, this can be ignored for amateur work and is quite small as the camera is small. The plate 20 in effect forms a window, as the operator looks directly through it to the scene, and when the eye is close to the rear of the camera, the size of the field of view on the plate 20 is the same as the field of view which passes through the exposure aperture 29, see Fig. 4, to expose the film. Also when the top 28 of the rear sight and the aperture 26 appear in alignment, the rear sight element 28 masks very slightly and thereby defines the center of the photographic field.

The plate 20 is free from opaque material around its side and top margins whereby the operator can by glancing to one side or the other see the adjoining or contiguous portion of the scene and hence readily decide whether to point the camera in a different direction to position properly the item of principal interest in the picture.

The rear sight 27 is mounted on a hinge 30, see Fig. 6, and it has a spring arm 31 adapted to engage a spring catch 32 to hold the rear sight 27 upright. When the view finder is to be collapsed, the rear sight 27 is moved counter-clockwise as seen in Fig. 6 so that it will lie flat on the bottom of recess 19 as shown in Fig. 2. The plate 20 is then swung down on top of the rear seight 27 and the spring arm 31 forms a spring catch to engage the top edge of view finder 20.

As shown in Figs. 7 to 9, the blinder arm 13 is connected to a rock shaft 33 pivotally supported in the front 5 above the front lens 34. On the rear end of shaft 33 is fixed a blinder 35 which is urged to the right as seen in Fig. 7, against a stop 36 by a spring 37. Blinder 35 has a projection 38 which engages the upper end of lever 39 to move the lever 39 and shutter 14 to the position shown in Fig. 7, with shutter 14 in cocked position and held against the tension of spring 15 by the lower end 40 of lever 39 resting against a horizontal shelf 41 on the rear end of the shutter release 18.

Shutter 14 has a sector shaped opening 42. When the blinder arm 13 is operated to cock the shutter 14, the lower end 40 of the lever 39 engages the cam 43 to push the slide 18 in against the action of its spring 44. When the arm 40 passes beyond the cam 43, the spring 44 pushes the release slide 18 out so that the shelf 41 will extend in front of the arm 40 and hold the shutter 14 cocked until such time as it is released by pushing in on the shutter release 18.

As shown in Fig. 9 the blinder 35 swings between the shutter 14 and the lever 39. The shutter 14 and the lever 39 are secured together in spaced relation and they pivot on a tube 50 press fitted into the front wall 5 below the front lens 34. Inside of tube 50 is a shaft 51 having arm 16 fixed on its outer end, and having spool 52 fixed on its inner end. The spring 15 is wound on spool 52, one of its ends 53 being fixed to the spool 52, and its other end 54 being extended to bear on the outer end of the arm 39.

Figure 3:
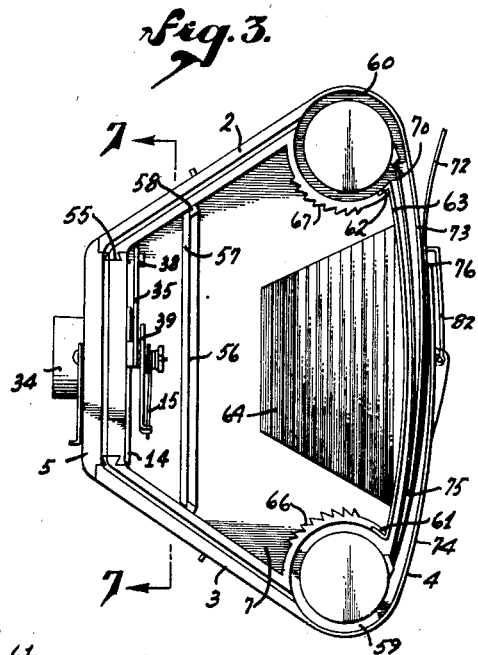
Fig. 3 is a plan view with the cover removed.
Figure 4:
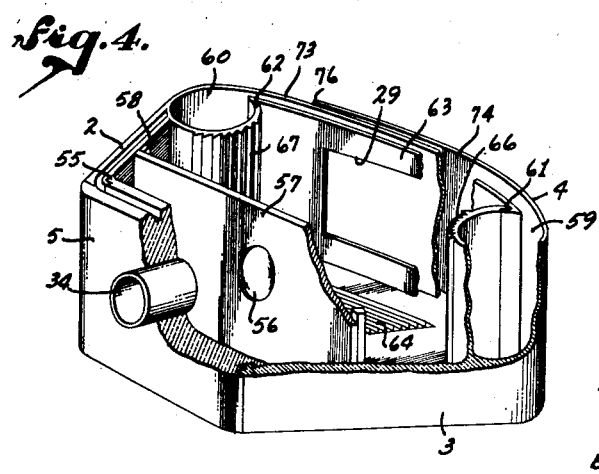
Fig. 4 is a perspective view with the cover removed and with parts broken away.

The shutter 14, blinder 35, shutter release 18 and associated parts, as well as front lens 34, may be mounted as a unit in the front 5 which can be slid into position shown in Fig. 1, to register with the side walls 2 and 3 by the tongue and groove 55, Figs. 3 and 4, and then cemented in place.

The shutter 14 as shown in Figs. 2 and 3 is midway between the front lens 34 and a rear lens 56, the latter being mounted in a plate 57 which can slide into and out of the casing, being held in position by suitable ribs 58.

Cast integral with the rear of the casing 1 are two cylindrical compartments 59 and 60, the former serving to house the supply spool and the other serving as a receiver. The cylinders 59 and 60 each has a longitudinal groove 61, 62 to slidably receive the inturned ends of a metal exposure aperture plate 63 which has a suitable velvet backing.

Light reflection inside of the camera may be reduced by suitable ribs 64 on the bottom of the casing, 65 on the top, see Fig. 6 also 66, 67 on the cylinders 59 and 60. As shown in Fig. 2 for the bottom ribs 64, all such ribs have a flat face 68 to intercept the side rays, and a slant face 69 facing the rear of the camera.

The sides 2 and 3, the walls 73 and 74, the bottom 7 and the compartments 59 and 60 may be cast in one integral piece. The parting line of the molds may be flush with the outer face of the bottom 7 and the mold halves may separate vertically as seen in Fig. 2, that is, parallel to the ribs 66 and 67, the camera casting having a slight taper to permit the draft of the mold.

As shown in Fig. 17, detachably secured to the inner end of the film 70, by gum or plastic adhesive 71, is a paper strip 72 which is substantially the same width and length as the film. The paper 72 is disconnected or free from the film otherwise. The paper 72 and film 70 thus secured only at their inner ends, are wound or coiled in a spiral and housed in the supply spool 10, Fig. 15, or 11, Fig. 12. Each coil of the paper extends between and protects the adjacent coils of the film. The back 4 has two overlapping walls 73, 74, see Fig. 12. Wall 73 is a continuation of side 2 and terminates away from supply compartment 59 as indicated at 75. Wall 74 is a continuation of side 3 and extends over the front of wall 73 and terminates as indicated at 76 to leave an outlet 77 for the paper strip 72. Wall 73 extends in front of and along aperture plate 63 to provide a path for film 70. The paper 72 and film 70 are separated at the left end 75 of wall 73, the space between walls 73 and 74 providing a path for the paper to the outlet 77. The film 70 is propelled or transported from spool 11 to spool 12 and across the film gate or aperture 29, simply by pulling on the exposed end 78 of the paper strip 72.

Spools 11 and 12 may be universal spools, each having a pair of springs 79, Fig. 13, to guide the end of the film into a coil as well known.

To limit the film travel step by step to the length of each picture, strip 72 has holes 80 spaced apart the picture length. Hinged on wall 74 as indicated at 81, is a plate 82 having a detent 83, Fig. 16, and opposite it is a depression 84. When the paper 72 is pulled out to propel the film, slight pressure on plate 82 causes detent 83 to engage a hole 80 and stop the paper, also the film at the right place. Plate 82 has a cutting edge 85 so that the extended end of the paper may be torn off. As each section of the paper corresponds to a picture, suitable notes or data for each picture may be written on its paper section, the wall 73 serving as a backing, if desired, for writing purposes.

As shown in Fig. 15, the springs 79 may be secured by rivets 86 in the receiver compartment 60. After the film is exposed, it is rewound on spool 10. In this case, the paper need not be cut off each time a picture is taken. It could be rolled up and suitably stored with or on the camera, and this paper could be rewound with the film.

Plate 57 is opaque and serves as a light shield.

Various modifications may be made in the invention without departing from the spirit of the following claims:

I claim:

1. A camera comprising a casing having a bottom and having rear corners and a cylindrical compartment integral with said bottom in each of said corners, one of said compartments serving as a supply spool compartment and the other thereof serving as a receiver compartment, each of said compartments having a longitudinally extending edge and an opening adjacent the rear of said casing, a removable aperture plate having ends slidably carried by said edges respectively and extending between said compartments from the inside of one of said openings to the inside of the other opening, an inner wall integral with said bottom and extending from the outside of said opening in said receiver, said inner wall extending towards said supply compartment, and a parallel overlapping outer wall integral with said bottom and extending from the outside of said opening in said supply compartment, said outer wall extending towards said receiver, said inner wall serving as a separator and providing two paths from said supply compartment, one of said paths extending from said supply compartment to said receiver between said inner wall and said aperture plate, and the other of said paths extending between said inner wall and said outer wall and opening at the exterior of said casing, said bottom, compartments and inner and outer walls comprising a unitary molding, said compartments and inner and outer walls having a taper permitting the draft of the die.

2. A camera comprising a box having an open top, said box having a bottom and side walls integral therewith, spaced substantially parallel cylindrical walls providing supply and receiver compartments, each of said cylindrical walls merging with and being enclosed by one of said side walls, wall means providing a path between said compartments and substantially tangent to both of said compartments, and other wall means providing a path substantially parallel to said first path and tangent to said supply compartment and opening to the exterior of said casing, means in said receiver compartment for receiving and guiding the free end of a film into a coil, a front wall having a lens and removably fitting said side walls, a cover fitting over said side walls, said cylindrical walls, said wall means, said other wall means and said front wall.

WALTER ALEXANDER LEA.

REFERENCES CITED

The following references are of record in the file of this patent:

UNITED STATES PATENTS

| Number | Name | Date |
|---|---|---|
| 607,428 | Esmond | July 19, 1898 |
| 1,060,636 | Ruttan et al. | May 6, 1913 |
| 1,479,112 | Sparks | Jan. 1, 1924 |
| 1,897,268 | Merle | Feb. 14, 1933 |
| 2,225,433 | Goldberg | Dec. 17, 1940 |
| 2,262,987 | Baxter | Nov. 18, 1941 |
| 2,338,657 | Mihalyi | Jan. 4, 1944 |
| 2,388,423 | Langdon | Nov. 6, 1945 |
| 2,391,377 | Aiken | Dec. 25, 1945 |

FOREIGN PATENTS

| Number | Country | Date |
|---|---|---|
| 265,218 | Great Britain | July 14, 1927 |
| 645,210 | Germany | Nov. 12, 1937 |